United States Patent
Jung et al.

(10) Patent No.: US 11,306,777 B2
(45) Date of Patent: Apr. 19, 2022

(54) MAGNETIC BEARING CONTROL APPARATUS, CONTROL METHOD AND HIGH SPEED ROTATING MOTOR USING THE SAME

(71) Applicant: LG Electronics Inc., Seoul (KR)

(72) Inventors: Keun Woo Jung, Seoul (KR); Kyung Min Kim, Seoul (KR); Jonghyun Jeon, Seoul (KR); Joonsik An, Seoul (KR)

(73) Assignee: LG Electronics Inc., Seoul (KR)

( * ) Notice: Subject to any disclaimer, the term of this patent is extended or adjusted under 35 U.S.C. 154(b) by 492 days.

(21) Appl. No.: 16/169,311

(22) Filed: Oct. 24, 2018

(65) Prior Publication Data

US 2019/0120290 A1 Apr. 25, 2019

(30) Foreign Application Priority Data

Oct. 24, 2017 (KR) ........................ 10-2017-0138612

(51) Int. Cl.
*H02K 7/09* (2006.01)
*F16C 32/04* (2006.01)
(Continued)

(52) U.S. Cl.
CPC ...... *F16C 32/0446* (2013.01); *F16C 32/0451* (2013.01); *F16C 32/0455* (2013.01);
(Continued)

(58) Field of Classification Search
CPC .............. F16C 32/0446; F16C 32/0451; F16C 32/0455; F16C 32/0461; F16C 32/0468;
(Continued)

(56) References Cited

U.S. PATENT DOCUMENTS

| | | | | |
|---|---|---|---|---|
| 5,347,190 A | * | 9/1994 | Lewis | F16C 32/0455 310/90.5 |
| 5,708,312 A | * | 1/1998 | Rosen | F16C 32/0451 180/165 |

(Continued)

FOREIGN PATENT DOCUMENTS

| | | | |
|---|---|---|---|
| CN | 107065546 A | * | 8/2017 |
| CN | 110469583 A | * | 11/2019 |

(Continued)

OTHER PUBLICATIONS

Extended European Search Report in European Appln. No. 18202292.1, dated Feb. 6, 2019, 10 pages.

*Primary Examiner* — Edgardo San Martin
(74) *Attorney, Agent, or Firm* — Fish & Richardson P.C.

(57) ABSTRACT

A magnetic bearing control apparatus includes a plurality of output elements configured to generate electromagnetic force, a magnetic bearing configured to float a rotation shaft from a surface of the magnetic bearing based on the electromagnetic force generated by the plurality of output elements, at least one displacement sensor configured to sense a displacement of the rotation shaft, and a controller. The controller is configured to control a current supplied to the plurality of output elements, to control a position of the rotation shaft based on the current supplied to the plurality of output elements according to the displacement of the rotation shaft, and to determine a failure of the displacement sensor.

14 Claims, 10 Drawing Sheets

(51) Int. Cl.
*H02P 6/12* (2006.01)
*H02P 6/28* (2016.01)
*H02P 6/17* (2016.01)

(52) U.S. Cl.
CPC ...... *F16C 32/0461* (2013.01); *F16C 32/0468* (2013.01); *F16C 32/0493* (2013.01); *H02K 7/09* (2013.01); *H02P 6/12* (2013.01); *H02P 6/17* (2016.02); *H02P 6/28* (2016.02)

(58) Field of Classification Search
CPC .......... F16C 32/0493; F16C 32/0444; F16C 32/044; F16C 32/0442; F16C 32/0406; H02P 6/17; H02P 6/28; H02P 6/12; H02K 7/09; H02K 7/08
See application file for complete search history.

(56) References Cited

U.S. PATENT DOCUMENTS

| | | | | |
|---|---|---|---|---|
| 5,998,899 | A | * | 12/1999 | Rosen ................ F16C 32/0446 310/112 |
| 6,124,658 | A | * | 9/2000 | Coenen ............... F16C 32/0444 310/90.5 |
| 9,388,854 | B2 | * | 7/2016 | Barada ................ F16C 32/0451 |
| 10,371,159 | B2 | * | 8/2019 | Kawashima ............. H02K 7/14 |
| 2006/0055259 | A1 | | 3/2006 | Hanlon et al. |
| 2015/0050170 | A1 | | 2/2015 | Kozaki |
| 2018/0363668 | A1 | * | 12/2018 | Castane Selga ...... F04D 27/003 |

FOREIGN PATENT DOCUMENTS

| | | |
|---|---|---|
| JP | H10009266 | 1/1998 |
| JP | 2003083330 | 3/2003 |
| JP | 2003148470 | 5/2003 |
| JP | 3649595 | 5/2005 |

* cited by examiner

US 11,306,777 B2

MAGNETIC BEARING CONTROL APPARATUS, CONTROL METHOD AND HIGH SPEED ROTATING MOTOR USING THE SAME

CROSS-REFERENCE TO RELATED APPLICATION

This application claims priority to and the benefit of Korean Patent Application No. 10-2017-0138612, filed on Oct. 24, 2017, the disclosure of which is incorporated herein by reference in its entirety.

FIELD

This application relates to a magnetic bearing control apparatus, a control method, and a high speed rotating motor using the same, and more particularly, to a magnetic bearing control apparatus, a control method, and a high speed rotating motor using the same, which enable determination of a normal or abnormal operation of a sensor that is configured to sense a position of a rotation shaft of the high speed rotating motor that is supported by a magnetic bearing.

BACKGROUND

A motor may include a rotation shaft or rotor that is rotatably installed inside a stator or stator. In some cases, the rotation shaft may rotate at a high speed.

The motor may be used as a driving device in various fields such as an automobile, a washing machine, and a compressor, for instance.

In some examples, the motor may include a bearing that supports and contact the rotation shaft. In other examples, a high speed rotating motor suitable for high speed rotation may be supported without a physical contact using a magnetic bearing.

In some examples of a high speed rotating rotor, a stator may be provided inside of a housing, and a rotation shaft may be rotatably installed at a central portion of the stator.

For example, the rotation shaft may rotate in a floated state in which a magnetic bearing may cause the rotation shaft to be spaced apart from the stator by a predetermined during rotation. In some cases when the rotation shaft is rotated in a state out of a set position with regard to the stator, noise may be generated. In some cases, a rotation speed of the rotation shaft may be degraded, and in a severe case, there is a concern that the rotation shaft may collide with and damage the inner parts of the housing or the stator.

In some examples, the high speed rotating motor may include a displacement sensor for sensing a position of the rotation shaft to control a rotation position of the rotation shaft and to control the rotation position of the rotation shaft. In some examples, a failure of the magnetic bearing may be diagnosed and controlled by using the rotation position of the rotation shaft that is sensed by the displacement sensor.

In some cases, the displacement sensor may be difficult to accurately measure the position of the rotation shall at the time of a failure or to determine abnormal operation of the displacement sensor. It is of interest to diagnose a failure itself of the displacement sensor.

SUMMARY

Disclosed are a magnetic bearing control apparatus, a control method, and a high speed rotating motor using the same that enable determination of a failure of a displacement sensor by sensing a position of a rotation shaft before or during driving of a high speed rotating motor to precisely control the position of the rotation shaft.

This application further provides a magnetic bearing control apparatus, a control method, and a high speed rotating motor using the same that can determine a failure of a current sensor and an output element by accumulating a stabilization time data and a floating of the rotation shaft.

This application also provides a magnetic, bearing control apparatus, a control method, and a high speed rotating motor using the same that can stably maintain a state until a rotation stop of the rotation shaft at the time of failure of a displacement sensor.

According to one aspect of the subject matter described in this application, a magnetic bearing control apparatus includes a plurality of output elements configured to generate electromagnetic force, a magnetic bearing configured to float a rotation shaft from a surface of the magnetic bearing based on the electromagnetic force generated by the plurality of output elements, at least one displacement sensor configured to sense a displacement of the rotation shaft, and a controller. The controller is configured to control a current supplied to the plurality of output elements, to control a position of the rotation shaft based on the current supplied to the plurality of output elements according to the displacement of the rotation shaft, and to determine a failure of the displacement sensor.

Implementations according to this aspect may include one or more of the following features. For example, the displacement sensor may include: a photo coupler arranged adjacent to the rotation shaft and configured to output a waveform having a frequency according to the displacement of the rotation shaft; a mixing portion configured to, based on a difference between a reference frequency and the frequency of the waveform, convert the waveform into a first signal having a conversion frequency; a differential amplifier configured to amplify a magnitude of the first signal; a noise filter configured to reduce a noise of the first signal amplified by the differential amplifier; a comparator configured to convert the first signal filtered by the noise filter into a conversion waveform according to the position of the rotation shaft; a multiplexer (MUX) configured to simplify the conversion waveform; and a digital signal processor (DSP) input port configured to convert the conversion waveform simplified by the MUX into a digital signal.

In some implementations, the controller is further configured to: adjust the electromagnetic force by increasing or decreasing the current supplied to the plurality of output elements based on the displacement of the rotation shaft; and based on adjustment of electromagnetic force, maintain a floated state of the rotation shaft at a set position. In some implementations, the displacement sensor is configured to detect a frequency of a signal corresponding to the position of the rotation shaft, where the controller is further configured to determine that the displacement sensor is disconnected from the controller based on the detected frequency being equal to zero. In some examples, the controller is further configured to determine a failure of the displacement sensor based on the detected frequency being outside of a predetermined frequency range.

In some implementations, the controller includes a storage portion that is configured to: accumulate data including a floating completion time that is taken to float the rotation shaft from a first position to a set position, a stabilization time in which the rotation shaft is disposed at the set position, and an amount of current consumed by the plurality of output elements to maintain the rotation shaft at a floated state; and based on the accumulated data, determine a reference floating completion time, a reference stabilization time, and a reference current value.

In some implementations, the magnetic bearing control apparatus further includes a current sensor configured to detect the current supplied to the plurality of output elements. In some implementations, the controller is further configured to: based on measurement of the displacement sensor, determine a present floating completion time and a present stabilization time; compare the present floating completion time to the reference floating completion time; compare the present stabilization time to the reference stabilization time; and determine a failure of the plurality of output elements or the current sensor based on at least one of (i) a difference between the present floating completion time and the reference floating completion time or (ii) a difference between the present stabilization time and the reference stabilization time.

In some examples, the controller is further configured to: determine a present amount of current supplied to the plurality of output elements; compare the present amount of current to the reference current value; and determine a failure of the plurality of output elements or the current sensor based on a difference between the present amount of current and the reference current value.

In some implementations, the magnetic bearing control apparatus further includes a plurality of current sensors configured to detect the current supplied to the plurality of output elements, and the displacement sensor includes a plurality of displacement sensors. In some examples, the controller is further configured to: based on the accumulated data, determine a failure of at least one of the plurality of displacement sensors, the plurality of output elements, or the plurality of current sensors; determine one or more displacement sensors that operate in a normal operation state, and one or more output elements that operate in a normal state; and based on determination of the failure, control the rotation shaft to stop rotating in a floated state by controlling the one or more displacement sensors that operate in the normal operation state or the one or more output elements that operate in the normal state.

In some implementations, the controller is further configured to, based on the rotation shaft stopping rotation, dispose the rotation shaft to an unfloated state by controlling the one or more output elements that operate in the normal state.

According to another aspect, a method for controlling a magnetic bearing includes detecting, by a displacement sensor, a frequency of a signal representing a position of a rotation shaft; determining a displacement of the rotation shaft based on the position of the rotation shaft; based on the frequency detected by the displacement sensor, determining whether the displacement sensor is in a normal operation state or in a failure state; determining, by a current sensor, a current supplied to an output element of the magnetic bearing; and controlling the current supplied to the output element of the magnetic bearing based on the displacement of the rotation shaft.

Implementations according to this aspect may include one or more of the following features. For examples, determining whether the displacement sensor is in the normal operation state or in the failure state may include: determining whether the detected frequency is within a predetermined frequency range; determining that the displacement sensor is in a disconnected state based on the detected frequency being equal to zero; and determining that the displacement sensor is in the failure state based on the detected frequency being outside of the predetermined frequency range.

In some implementations, controlling the current includes: accumulating data including a floating completion time taken to float the rotation shaft from a first position to a set position, a stabilization time in which the rotation shaft is disposed at the set position, and an amount of current consumed by the output element to maintain the rotation shaft at a floated state; based on the accumulated data, determining a reference floating completion time, a reference stabilization time, and a reference current value; based on measurement of the displacement sensor, determining a present floating completion time and a present stabilization time; comparing the present floating completion time to the reference floating completion time; comparing the present stabilization time to the reference stabilization time; determining a failure of the output element or the current sensor based on at least one of (i) a difference between the present floating completion time and the reference floating completion time or (ii) a difference between the present stabilization time and the reference stabilization time; determining a present amount of current supplied to the output element; comparing the present amount of current to the reference current value; and determining a failure of the output element or the current sensor based on a difference between the present amount of current and the reference current value.

In some implementations, controlling the current includes adjusting electromagnetic force of the magnetic bearing by increasing or decreasing the current supplied to the output element based on the displacement of the rotation shaft. In some examples, the displacement sensor includes a plurality of displacement sensors, the current sensor includes a plurality of current sensors, and the output element includes a plurality of output elements. In the same or other examples, controlling the current further includes: determining a failure of at least one of the plurality of displacement sensors, the plurality of output elements, or the plurality of current sensors; determining one or more displacement sensors that operate in the normal operation state, and one or more output elements that operate in a normal state; and based on determination of the failure, controlling the rotation shaft to stop rotating in a floated state by controlling the one or more displacement sensors that operate in the normal operation state or the one or more output elements that operate in the normal state.

In some implementations, controlling the current further includes descending, based on the rotation shaft stopping rotation, the rotation shaft to an unfloated state by controlling the one or more output elements that operate in the normal state.

According to another aspect, a high speed rotating motor includes: a stator configured to generate first electromagnetic force; a rotation shaft arranged inside of the stator and configured to rotate based on the first electromagnetic force; a magnetic bearing configured to float the rotation shaft from a surface of the magnetic bearing, the magnetic bearing comprising a plurality of output elements configured to generate second electromagnetic force and configured to enable the magnetic bearing to maintain a predetermined distance between the rotation shaft and the stator based on the second electromagnetic force; at least one displacement sensor configured to sense a displacement of the rotation shaft; and a controller. The controller is configured to: control a current supplied from the plurality of output elements to the magnetic bearing; control a position of the rotation shaft based on the displacement of the rotation shaft; and determine a failure of the displacement sensor.

Implementations according to this aspect may include one or more of the following features. For example, the displacement sensor may include: a photo coupler arranged adjacent to the rotation shaft and configured to output a waveform having a frequency according to the displacement of the rotation shaft; a mixing portion configured to, based on a difference between a reference frequency and the frequency of the waveform, convert the waveform into a first signal having a conversion frequency; a differential amplifier configured to amplify a magnitude of the first signal; a noise filter configured to reduce a noise of the first signal amplified by the differential amplifier; a comparator configured to convert the first signal filtered by the noise filter into a conversion waveform according to the position of the rotation shaft; a multiplexer (MUX) configured to simplify the conversion waveform; and a digital signal processor (DSP) input port configured to convert the conversion waveform simplified by the MUX into a digital signal.

In some implementations, the controller is further configured to: adjust electromagnetic force by increasing or decreasing the current supplied from the plurality of output elements to the magnetic bearing based on the displacement of the rotation shaft; and based on adjustment of electromagnetic force, maintain a floated state of the rotation shaft at a set position. In some examples, the displacement sensor is configured to detect a frequency of a signal corresponding to the position of the rotation shaft, where the controller is further configured to determine that the displacement sensor is disconnected from the controller based on the detected frequency being equal to zero.

According to this application, it may be possible to precisely determine the failure or not of the displacement sensor that senses the position of the rotation shaft to prevent the rotation shaft from being rotated in a state in which the displacement sensor is failed. Further, this application can precisely control the position of the rotation shaft since the displacement sensor always operates normally, and detect the failure of the displacement sensor rapidly. Thus, it may be possible to control it so as to operate the magnetic bearing only by the displacement sensor that is not failed, and thus, it is possible to prevent the rotation shaft from being collided with the stator, etc., in a rotation process.

Further, this application can reliably operate the displacement sensor through a failure diagnosis of the displacement sensor. By using this, it may be possible to detect a failure or not of the current sensor or the output element by comparing the floating completion time and the stabilization time of the rotation shaft with the floating completion time and the stabilization time of the rotation shaft during normal operation, thereby preventing a malfunction of the rotation shaft in advance.

Further, this application can stably stop and seat the rotation shaft at the time of a failure determination of a displacement sensor, etc., thereby preventing a collision or a malfunction of the rotation shaft and preventing the failure due to the above.

As described above, this application has an effect that it is possible to accurately detect the failure or the normal status of the displacement sensor, thereby improving the reliability of the magnetic bearing, and preventing the failure in advance, and a precise control is possible, thereby enabling the high speed rotation.

DETAILED DESCRIPTION

Figure 1:
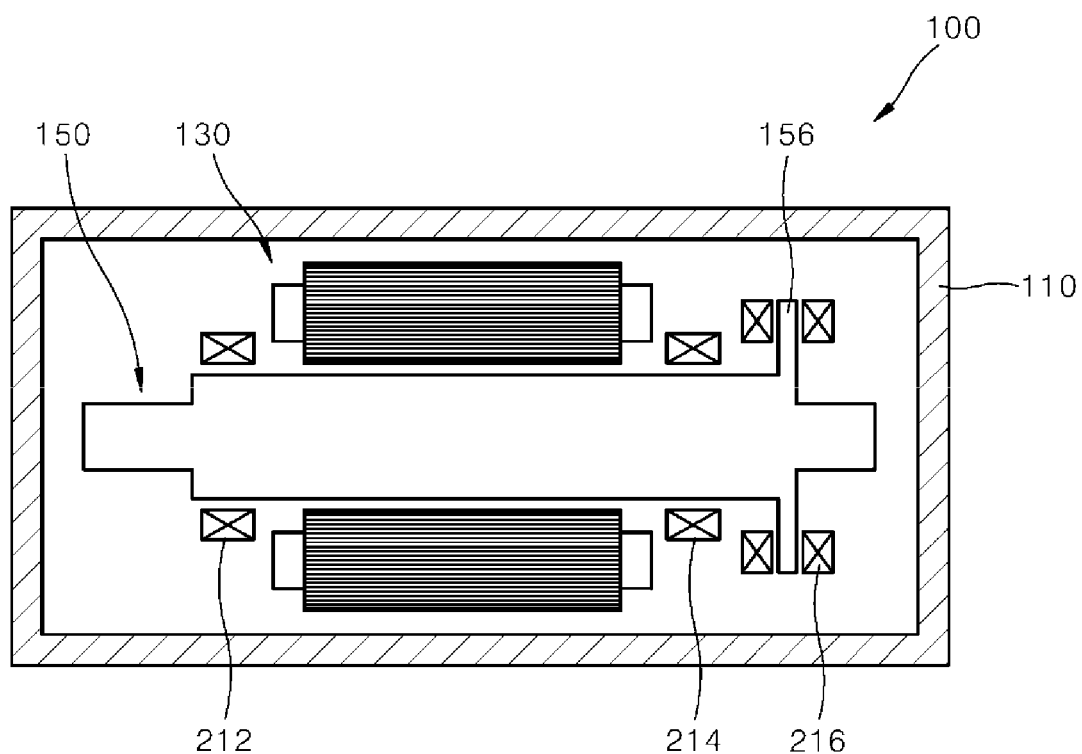
FIG. 1 is a cross-sectional view schematically showing an example of a high speed rotating motor.

Since a configuration described in the drawings and an implementation described in the present specification are merely one or more example implementations of this application, and do not represent all the technical ideas of this application, it should be understood that various equivalents and modifications that can replace them will be made at the time of this application. Further, the terms described below are the terms that are defined in consideration of a function of this application, which may vary depending on an intention or custom of a user and an operator. Therefore, a definition of these terms should be based on the contents throughout the present specification.

Hereinafter, a high speed rotating rotor in accordance with an exemplary implementation of this application will be described.

FIG. 1 is a cross-sectional view schematically showing an example of a high speed rotating motor.

A high speed rotating motor 100 may include a housing 110, a stator 130, and a rotation shaft 150. The high speed rotating motor 100 may be an apparatus that generates a driving force by rotating the rotation shaft 150 at a high speed.

The housing 110 may form an outer shape of the high speed rotating motor 100 and an inside thereof can be hollow. A stator 130 that generates an electromagnetic force by a supply of a current inside of the housing 110 may be installed.

The stator 130 may include a core that is formed with a plurality of poles, and a coil can be wound in each pole. An electromagnetic force may be generated in the coil and the pole by the supply of the current.

Further, the rotation shaft 150 may be rotatably installed at a central portion of the stator 130. The rotation shaft 150 may include a permanent magnet, and may be rotated by the electromagnetic force generated in the stator 130 to generate a driving force.

The rotation shaft 150 may be arranged so as to be rotated in a state that has a predetermined distance from the stator 130. For this purpose, the rotation shaft 150 may be supported by a magnetic bearing 210 that a position thereof is controlled by the electromagnetic force without a physical contact.

The magnetic bearing 210 can be classified into the radial bearings 212 and 214 that support the rotation shaft 150 in a radial direction and a thrust bearing 216 that supports the rotation shaft 150 in an axial direction.

The thrust bearing 216 may be installed by having a shaft supporting plate 156 therebetween that extends in the radial direction at an end of the rotation shaft 150. The thrust bearing 216 can support that the rotation shaft 150 is moved in the axial direction.

The magnetic bearing 210 may have a plurality of output elements and can control an electromagnetic force generated in these output elements to float the rotation shaft 150.

Further, the high speed rotating motor 100 may include at least one displacement sensor. The displacement sensor may sense a displacement of the rotation shaft 150 so that the magnetic bearing 210 can float the rotation shaft 150 at an accurate position.

Further, the high speed rotating motor 100 may include a controller. The controller may control a current supplied to an output element to control the position of the rotation shaft 150 by using the displacement of the rotation shaft 150 sensed in the displacement sensor, and determines a failure or not of the displacement sensor.

Figure 2:
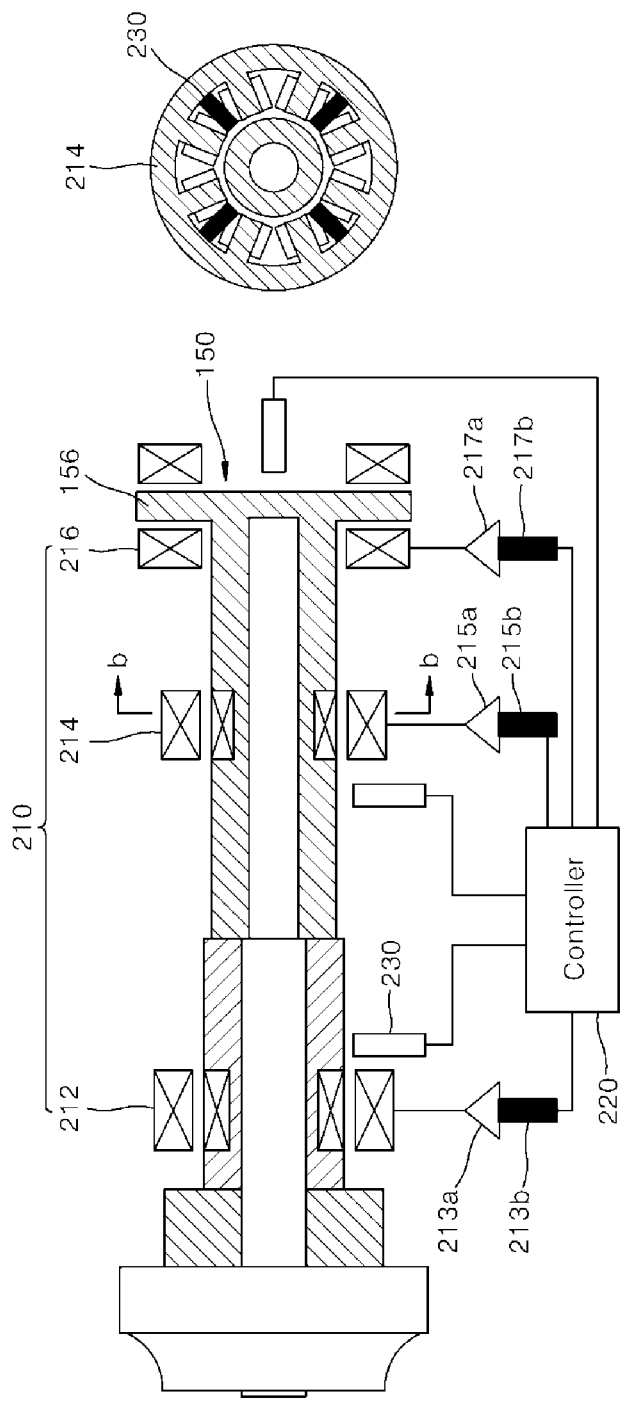
FIGS. 2A and 2B are views schematically showing examples of a magnetic bearing control apparatus that is applied to a high speed rotating motor.

FIGS. 2A and 2B are views schematically showing examples of a magnetic bearing control apparatus applied to a high speed rotating motor.

Referring to FIGS. 2A and 2B, a magnetic bearing control apparatus 200 may include a magnetic bearing 210 that supports at least both ends of a rotation shaft 150.

Specifically, the magnetic bearing 210 may include a first radial bearing 212 and a second radial bearing 214 that control the position of the rotation shaft 150 in a radial direction.

Further, the magnetic bearing 210 may include a thrust bearing 216 that supports the front and rear surfaces of a shaft supporting plate extending in the radial direction at the end of the rotation shaft 150 to control that the rotation shaft 150 moves in an axial direction.

Further, the first and second radial bearings 212 and 214 and the thrust bearing 216 may include each output elements 213a, 215a, and 217a that generate an electromagnetic force by a supply of a current, and the current sensors 213b, 215b, and 217b that measure a current of the output element. As the output elements 213a, 215a, and 217a may be connected to a controller 220 and a current supply may be controlled, it may be possible to control a floating of the rotation shaft 150.

Further, the magnetic bearing control apparatus 200 may include a plurality of displacement sensors 230 installed adjacent to the rotation shaft 150. The plurality of displacement sensors 230 can measure a displacement of the rotation shaft 150 and can measure a spaced distance from a stator by using it.

The displacement of the rotation shaft 150 measured in the displacement sensor 230 may be transmitted to a controller 220. The controller 220 may control the output elements 213a, 215a, and 217a of the first and second radial bearing 214 and the thrust bearing 216 to control the position of the rotation shaft 150 to a predetermined position.

Further, the displacement sensor 230 may be connected to the controller 220 to transmit displacement information of the sensed rotation shaft 150.

The controller 220 may control a current supply of the output elements 213a, 215a, and 217a of the thrust bearing 216 and the first and second radial bearings 214 in order to control the position of the rotation shaft 150 by using the sensed displacement in the displacement sensor 230.

Further, the controller 220 may determine a failure or not of the displacement sensor 230 by using the sensed displacement of the displacement sensor 230.

Here, the displacement sensor 230 may output it as a square wave that has a cycle according to a position, other than an output of an existing voltage type. In some implementations, the displacement sensor 230 may output a waveform such as a sinusoidal wave other than the square wave.

Figure 3:
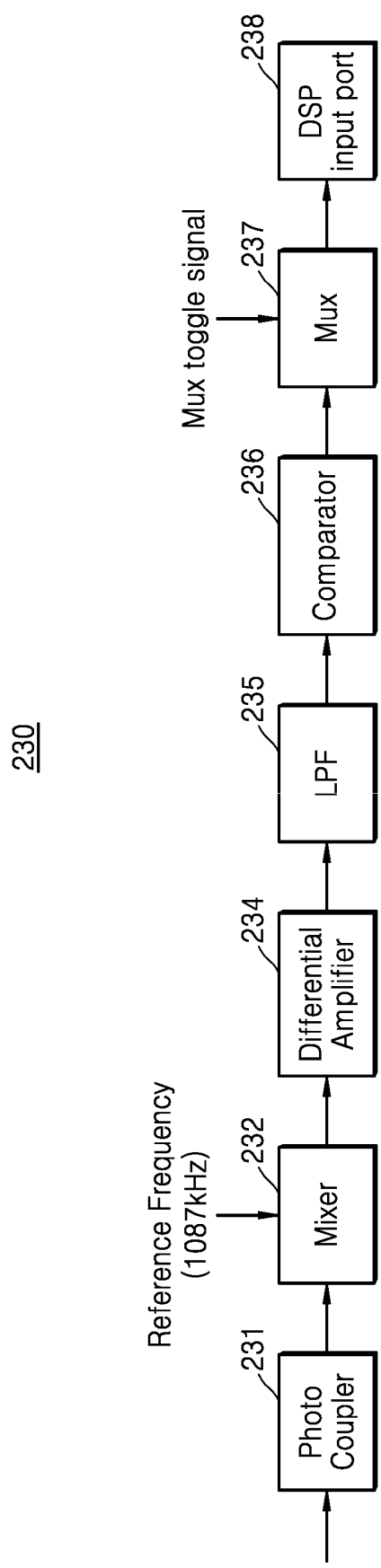
FIG. 3 is a block diagram showing an example of a displacement sensor of a magnetic bearing control apparatus.

Referring to FIG. 3, which is a block view showing an example of a displacement sensor of a magnetic bearing control apparatus, a displacement sensor 230 may include a photo coupler 231, a mixing portion 232, a differential amplifier 234, a noise filter 235, a comparator 236, a multiplexer (MUX) 237, and a digital signal processor (DSP) input port 238.

The photo coupler 231 may be arranged adjacent to one side of a rotation shaft 150 to output a displacement of the rotation shaft 150 as a square wave that has a cycle according to a position.

The photo coupler 231 may be connected to the mixing portion 232. The mixing portion 232 may convert a square wave with regard to the displacement of the rotation shaft 150 sensed in the photo coupler 231 into a conversion frequency. The conversion frequency may be a frequency that is converted by a difference from a reference frequency. The reference frequency may be an average value of a square wave sensed in the displacement sensor 230, and in addition to that, it may be a preset value to facilitate a conversion of the square wave.

The differential amplifier 234 may be connected to the mixing portion 232 to amplify a signal magnitude of the conversion frequency converted in the mixing portion 232. A signal amplified in the differential amplifier 234 may be subjected to the noise filter 235 so that noise can be removed.

The conversion frequency that the noise is reduced in the noise filter 235 can be converted into a conversion square wave according to a position in the comparator 236.

As the conversion square wave converted in the comparator 236 is subjected to the MUX 237, a signal can be simplified. For example, the MUX 237 can simplify two or more signals into one signal by using a toggle signal.

The simplified signal in the MUX 237 can be outputted as a digital signal by the DSP input port 238.

The controller 220 may adjust an electromagnetic force by increasing and decreasing a current supplied to the output elements 213a, 215a, and 217a of the magnetic bearing 210 so as to maintain a floated state at a position that the rotation shaft 150 is set according to displacement information of a rotation shaft 150 sensed from the displacement sensor 230.

In some implementations, a magnetic bearing control apparatus 200 may determine a normal operation or not of the displacement sensor 230 in advance in a state in which the rotation shaft 150 is not floated, i.e. before operation of a high speed rotating motor 100.

The magnetic bearing control apparatus 200 can transmit a detection frequency according to the position of the rotation shaft 150 measured in the displacement sensor 230 to a controller 220 in a state in which the rotation shaft 150 is not floated. The controller 220 may determine that the displacement sensor 230 cannot accurately sense the position of the rotation shaft 150 when the detection frequency is 0. The controller 220 can determine that the displacement sensor 230 is in a disconnection state, for example, when the detection frequency is 0.

On the other hand, when the detection frequency is detected in an outside area of an allowable frequency, the controller 220 may determine it as a failure of the displacement sensor 230.

Figure 4A:
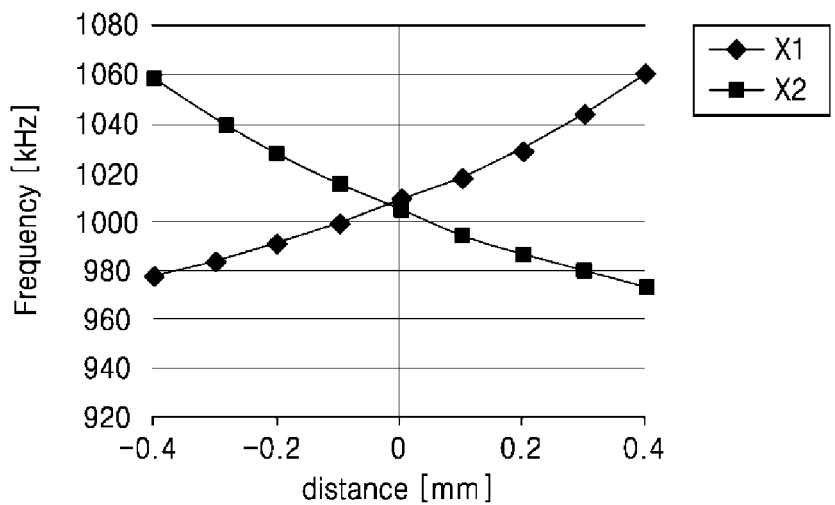
FIGS. 4A and 4B are views showing examples of a frequency according to a position of a rotation shaft that is measured in a displacement sensor in a radial direction of a rotation shaft.
Figure 4B:
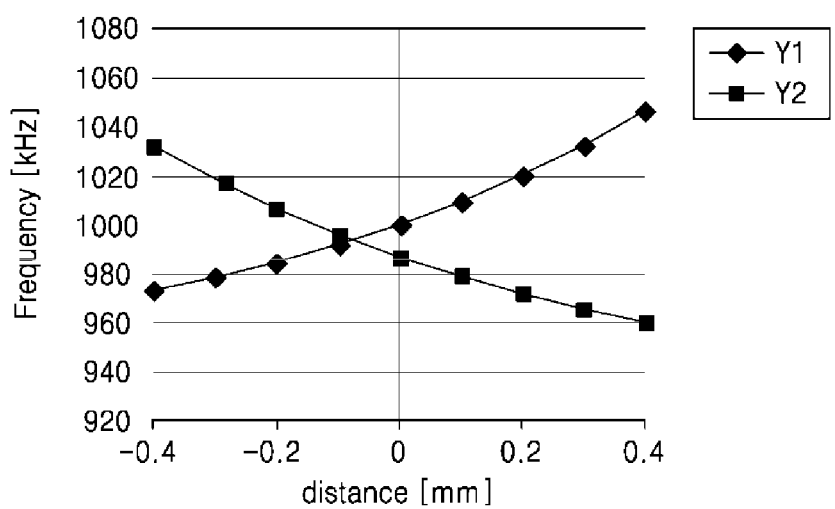
Figure 4C:
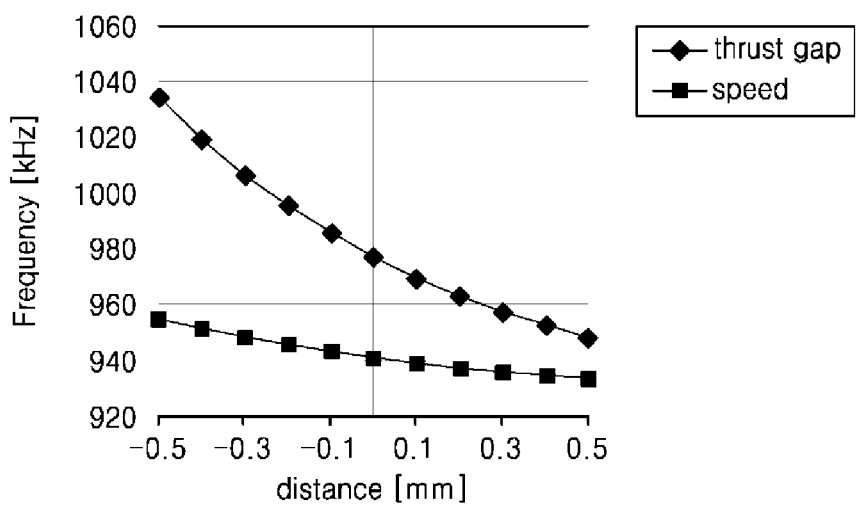
FIG. 4C is a view showing an example of a frequency according to a position of a rotation shaft that is measured in a displacement sensor in an axial direction of a rotation shaft.
Figure 5:
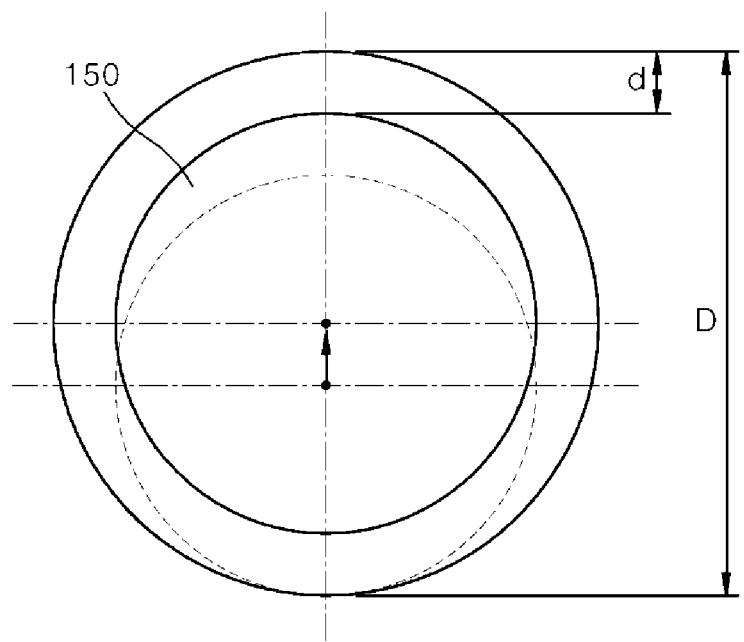
FIG. 5 is a view showing an example of a control range of a rotation shaft that is controlled by a magnetic bearing control apparatus.

FIGS. 4A and 4B are views showing examples of a frequency according to a position of the rotation shaft 150 measured in a displacement sensor 230 in a radial direction of a rotation shaft 150, and FIG. 4C is a view showing an example of a frequency according to the position of the rotation shaft 150 measured in the displacement sensor 230 in an axial direction of the rotation shaft 150. Further, FIG. 5 is a view showing an example of a control range of a rotation shaft that is controlled by a magnetic bearing control apparatus.

Referring to FIGS. 4A-4C and Table 1, a frequency variation width in a radial direction of the rotation shaft 150 measured in the displacement sensor 230 may be 960 kHz to 1060 kHz, for example, and can vary in a range of about 100 kHz. In some examples, a frequency variation width in an axial direction measured in the displacement sensor 230 may be 934 kHz to 1035 kHz, for example, and can vary in a range of about 101 kHz. Here, X1 and X2 are the measured values of a displacement sensor 230 provided in a first radial bearing, and Y1 and Y2 are the measured values of a displacement sensor 230 provided to a second radial bearing.

TABLE 1

| Classification (kHz) | | Maximum (MAX) | Minimum (min) | Range (Range) |
|---|---|---|---|---|
| Radial direction | X1 | 1060 | 978 | 1060 − 960 = 100 |
| | X2 | 1058 | 973 | |
| | Y1 | 1046 | 972 | |
| | Y2 | 1032 | 960 | |
| Axial | Thrust | 1035 | 949 | 1035 − 934 = 101 |
| | Speed | 955 | 934 | |

In some implementations, as shown above, a sampling frequency of each signal may be 20 kHz, and at least 50 kHz or more of a signal may be required in order to receive a signal stably. In some examples, for stable operation, a safety factor of 20% may be provided, and a signal of 60 kHz or more may be received.

Further, when a difference between the maximum and minimum output frequencies in a radial direction and an axial direction, respectively, is about 100 kHz, if a safety factor of 20% is provided, it can be seen that an output frequency range may be 120 kHz.

Further, in view of the above output frequency, as shown in FIG. 5, a rotation shaft 150 of a high speed rotating motor 100 can control a space of 400 μm of diameter (φ) in a control distance D. For example, the rotation shaft 150 can be controlled so as to have a distance d of about 200 μm from a stator.

When the position of the rotation shaft 150 is controlled in the control distance D, it can be seen that the range of the output frequency with regard to a displacement of the rotation shaft 150 is 60 to 180 kHz.

That is, when the frequency of the rotation shaft 150 measured in a displacement sensor 230 is 400 μm (+200 μm based on a central axis), which is the highest part of a control range of the rotation shaft 150, the frequency can be indicated as 180 kHz. In the case of 0 μm (−200 μm based on the central axis) which is the lowest part of a control range of the rotation shaft 150, the frequency can be indicated as 60 kHz.

Therefore, a controller 220 may determine it as a normal operation when the frequency of the rotation shaft 150 measured in the displacement sensor 230 is 60 kHz to 180 kHz. When the frequency of the rotation shaft 150 is less than 60 kHz or exceeds 180 kHz, it can determine the displacement sensor 230 as a failure state.

The controller 220 can control a drive stop command of a magnetic bearing 210 when it detects the displacement sensor 230 as a failure state.

As mentioned above, the controller 220 is described as determining the failure state of the displacement sensor 230 and controlling the drive stop command. In addition to that, the controller 220 may be possible to control an operation of the magnetic bearing 210 to determine a failure or not of the current sensors 213b, 215b, and 217b and the output elements 213a, 215a, and 217a.

Specifically, the controller 220 may further include a storage portion that stores a floating completion time of the rotation shaft 150 and a stabilization time that the rotation shaft 150 is disposed at a set position, and a current value of the output elements 213a, 215a, and 217a that are consumed for a floating of the rotation shaft 150 as data of a reference floating completion time, a reference stabilization time, and a reference current value. The floating completion time of the rotation shaft 150, the stabilization time that the rotation shaft 150 is disposed at the set position, and the current value of the output elements 213a, 215a, and 217a that are consumed for the floating of the rotation shaft 150 can be measured by using the current sensors 213b, 215b, and 217b that are provided in the output elements 213a, 215a, and 217a or the displacement sensor 230.

In some examples, the floating completion time may be determined based on completion of movement of the rotation shaft from a set position. The floating completion time may be a period of time taken to float the rotation shaft from a first position (e.g., unfloated position) to a set position (e.g., a center of the magnetic bearing) until the rotation shaft stays at the set position.

Further, the controller 220 may measure the floating completion time of the rotation shaft 150 measured in the displacement sensor 230 and the stabilization time that the rotation shaft 150 is disposed at the set position, and compare it with data of the reference stabilization time and the reference floating completion time stored in the storage portion. In comparison with it, when a time difference occurs, it can determine it as a failure of the current sensors 213b, 215b, and 217b that control a current supply of the output elements 213a, 215a, and 217a.

Further, when a current amount difference occurs by measuring a current value of the output elements 213a, 215a, and 217a and comparing it with the reference current value stored in the storage portion, the controller 220 may determine it as a failure of the output elements 213a, 215a, and 217a.

In the present implementation, when any one of the displacement sensors 230 or any one of the output elements 213a, 215a, and 217a is determined as a failure, the controller 220 can be possible to control the output elements 213a, 215a, and 217a so as to stop in a state in which the rotation shaft 150 is stopped in a floated state at the set position by using the remainder of doing a normal operation of the displacement sensor 230 or the output sensor.

The controller 220 can determine the failure or not of the displacement sensor 230 or the output elements 213a, 215a, and 217a. If the displacement sensor 230 or the output elements 213a, 215a, and 217a are detected as a failure state by using it, the controller 220 may provide a command so as to stop the rotation shaft 150. Therefore, it may be possible to prevent a failure due to an incomplete rotation operation of the rotation shaft 150.

Further, when a stopping of the rotation shaft 150 is completed, the controller 220 may control the output elements 213a, 215a, and 217a so as to descend the rotation shaft 150. The rotation shaft 150 may be stably descended to a bottom of the stator 130 in a completely stopped state.

A magnetic bearing control method that controls the magnetic bearing control apparatus constructed as mentioned above will be described as follows.

Figure 6:
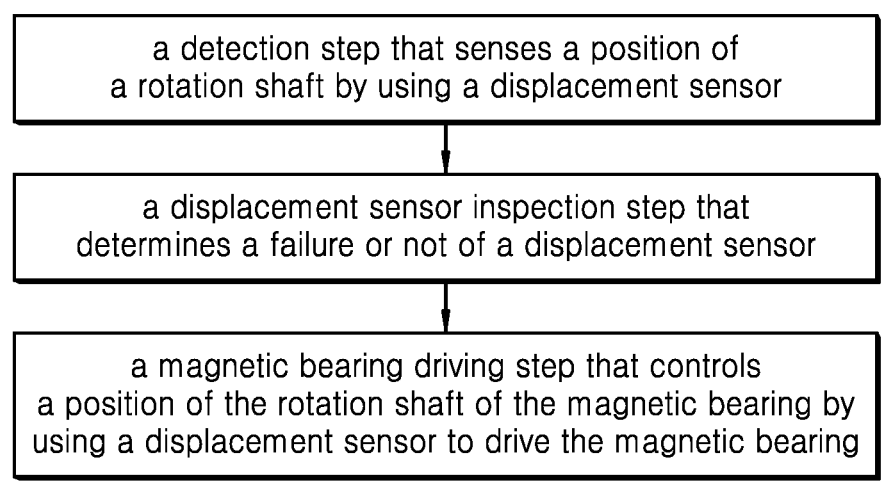
FIG. 6 is a block view of an example of a magnetic bearing control method.
Figure 7:
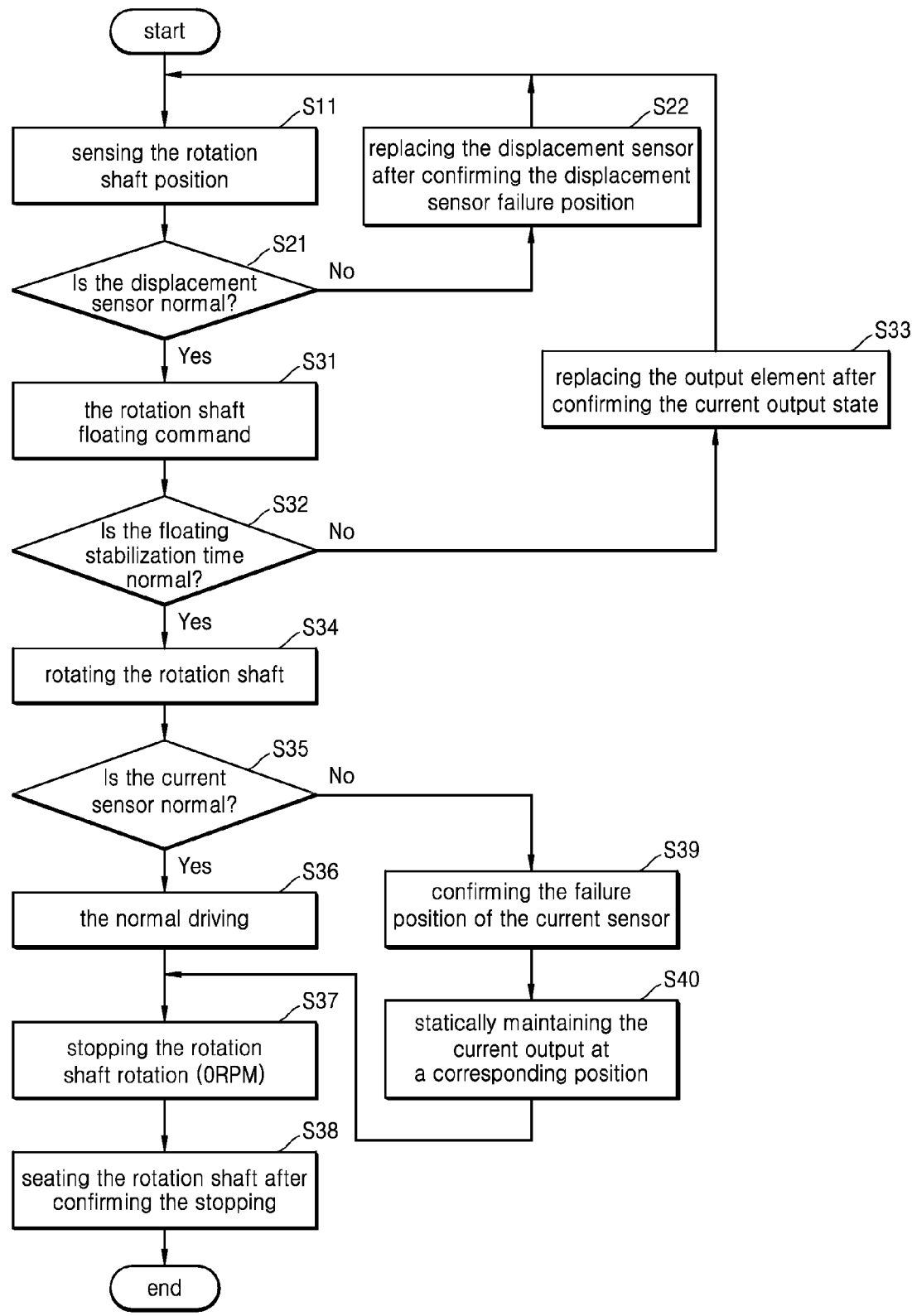
FIG. 7 is a flowchart showing an example of a magnetic bearing control method.

FIG. 6 is a block view of an example of a magnetic bearing control method, and FIG. 7 is a flowchart showing an example of a magnetic bearing control method.

Referring to FIGS. 6 and 7, a magnetic bearing control method may include a detection step, a displacement sensor inspection step, and a magnetic bearing driving step. In the case in which a control subject is not mentioned in each step, a subject of control or determination is the above-mentioned magnetic bearing control apparatus 200.

First, the magnetic bearing control method may include a detection step that senses a position of a rotation shaft 150 before a high speed rotating motor 100 is operated.

The detection step may sense a position of the rotation shaft 150 by using a displacement sensor 230 and generate a frequency according to the position of the rotation shaft 150. The detection step may detect the position of the rotation shaft 150 according to a frequency generated in the displacement sensor 230 (see S11).

When the frequency according to the position of the rotation shaft 150 is detected in the detection step, a displacement sensor inspection step may proceed.

In the displacement sensor inspection step, it may be possible to determine a normal operation or not of the displacement sensor 230 by comparing a detected frequency of the displacement sensor 230 (see S21).

When it is determined that the displacement sensor 230 is not normal in the displacement sensor inspection step, it may be possible to detect a failure position of the displacement sensor 230 and replace a failed displacement sensor 230 (see S22).

On the other hand, when it is determined that the displacement sensor 230 is normal in the displacement sensor inspection step, a magnetic bearing driving step may proceed.

The magnetic bearing driving step may control a current supply of the output elements 213a, 215a, and 217a to float the rotation shaft 150 (see S31).

On the other hand, the magnetic bearing driving step may measure a floating completion time and a floating stabilization time, when floating the rotation shaft 150, and may include a data generation step that accumulates the floating completing time of the rotation shaft 150 and a stabilization time that the rotation shaft 150 is disposed at a set position, and a current value of the output elements 213a, 215a, and 217a that are consumed for a floating of the rotation shaft 150 as data of a reference floating completion time, a reference stabilization time, and a reference current value, respectively, and store them.

Further, the magnetic bearing driving step may include a second failure determination step that determines it as a failure of the current sensors 213b, 215b, and 217b that measure a current supplied to the output elements 213a, 215a, and 217a, or the output elements 213a, 215a, and 217a, when a time difference occurs by comparing a reference floating completion time and a reference stabilization time that are generated in a data generation step and stored in a storage portion with a floating completion time and a stabilization time that are measured in the displacement sensor 230 in real time.

The second failure determination step may determine the output elements 213a, 215a, and 217a or the current sensors 213b, 215b, and 217b as a failure state when a floating completion time or a floating stabilization time is longer than a reference time.

Further, the magnetic bearing driving step may include a third failure determination step.

The third failure determination step may determine the output elements 213a, 215a, and 217a or the current sensors 213b, 215b, and 217b as a failure state when a difference in a current amount occurs by measuring a current value of the output elements 213a, 215a, and 217a and comparing it with a reference current value that is stored in a storage portion.

When the output elements 213a, 215a, and 217a or the current sensors 213b, 215b, and 217b are determined as a failure, it may be possible to replace the output elements 213a, 215a, and 217a determined as the failure (see S33).

On the other hand, when a measured flotation stabilization time is determined as normal, it may be possible to rotate the rotation shaft 150 (see S34).

Further, when the rotation shaft 150 rotates, it may be possible to determine whether the current sensors 213b, 215b, and 217b that measure a current supplied to the output elements 213a, 215a, and 217a are normal (see S35).

Here, if the current sensors 213b, 215b, and 217b are determined as normal, a normal operation may proceed. When an operation is completed, a rotation of the rotation shaft 150 may be stopped. When a stopping of the rotation shaft 150 is confirmed, it may be possible to descend the rotation shaft 150 and seat it. On the other hand, the current sensors 213b, 215b, and 217b are determined as normal, the normal operation may proceed. When the operation is completed, the rotation of the rotation shaft 150 is stopped. When the stopping of the rotation shaft 150 may be confirmed, it may be possible to descend the rotation shaft 150 and seat it (see S36, S37, and S38).

On the other hand, when the current sensors 213b, 215b, and 217b are determined as not being normal, a failure position of the current sensors 213b, 215b, and 217b may be confirmed and a command to stop the rotation of the rotation shaft 150 may be provided (see S39). During the stop of the rotation shaft 150, a current output at a corresponding position may be statically maintained, and may be decelerated to be stopped in a state in which the rotation shaft 150 is stably floated (see S40). When a stop of the rotation shaft 150 is confirmed, it may be possible to descend the rotation shaft 150 and seat it.

Figure 8:
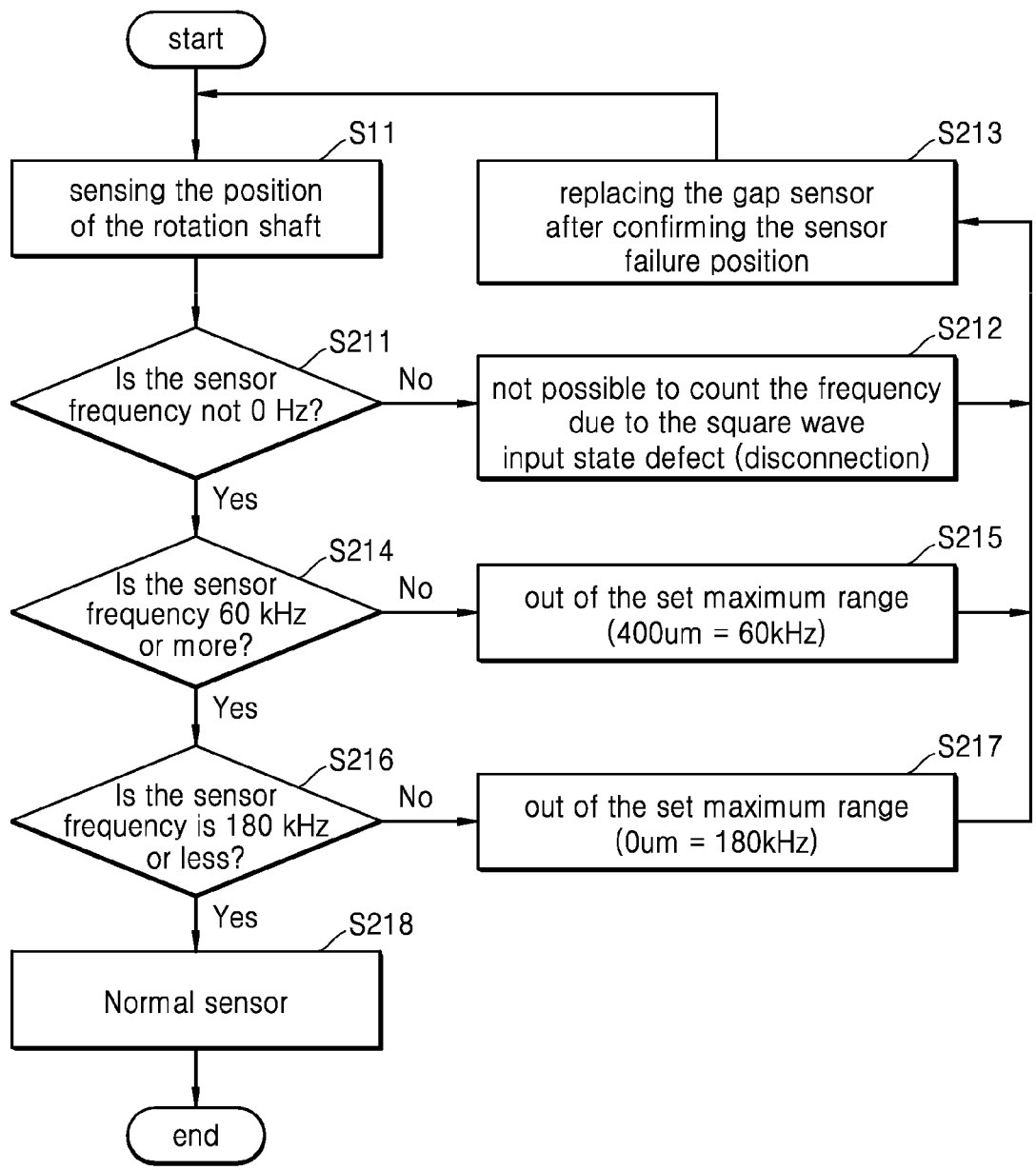
FIG. 8 is a flowchart of an example of displacement sensor inspection of a magnetic bearing control method.

FIG. 8 is a flowchart of an example of displacement sensor inspection of a magnetic bearing control method.

A displacement sensor inspection step will be described in more detail with reference to FIG. 8. In the case in which a control subject is not mentioned in each step, a subject of control or determination is the above-mentioned controller 220.

The displacement sensor inspection step may include a frequency comparison step that determines whether a detection frequency according to a position of a rotation shaft 150 detected in a detection step is within an allowable frequency.

Further, when a frequency according to the position of the rotation shaft 150 is compared in the frequency comparison step, a first failure determination step that determines a failure of a displacement sensor 230 may proceed based on the above.

In the first failure determination step, when a detection frequency is 0, the displacement sensor 230 may be a square wave input state defect, which is a state that cannot count a frequency (see S211). With regard to this state, the first failure determination step may determine it as a disconnection of the displacement sensor 230, and replace the displacement sensor 230 after confirming a failure position of the displacement sensor 230 (see S212 and S213).

Next, when the detection frequency is not 0, it is confirmed as to whether the detection frequency is 60 kHz or more (see S214).

For example, when the detection frequency is less than 60 kHz, it can determine that the rotation shaft 150 is out of a lower limit value of a set maximum control range. With regard to this state, the first failure determination step may determine it as a failure of the displacement sensor 230 and replace the displacement sensor 230 after confirming a failure position of the displacement sensor 230 (see S213 and S215).

Next, it is confirmed as to whether the detection frequency is 180 kHz or less (see S216).

For example, when the detection frequency is higher than 180 kHz, it can determine that the rotation shaft 150 is out of an upper limit value of a set maximum control range. With regard to this state, the first failure determination step may determine it as a failure of the displacement sensor 230, and replace the displacement sensor 230 after confirming a failure position of the displacement sensor 230 (see S213 and S217).

On the other hand, when the detection frequency of the displacement sensor 230 is detected at 60 kHz to 180 kHz, the first failure determination step may determine the displacement sensor 230 as a normal state (see S218).

Figure 9:
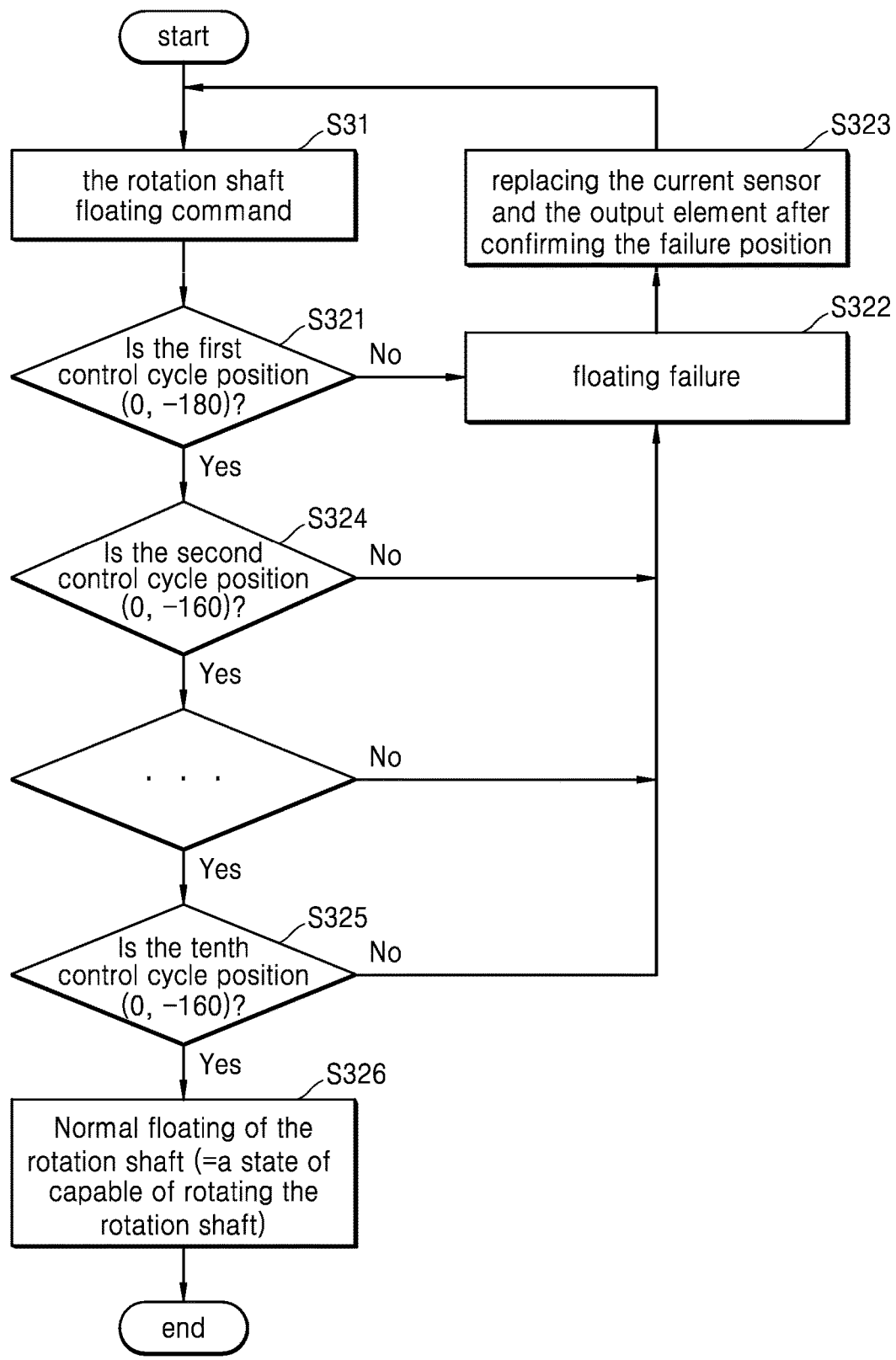
FIG. 9 is a flowchart of an example of determination of a rotation shaft stabilization state of a magnetic bearing control method.

FIG. 9 is a flowchart of an example of determination of a rotation shaft stabilization state of a magnetic bearing control method.

Referring to FIG. 9, a method that determines a floating stabilization state of a rotation shaft 150 in a magnetic bearing driving step, and determines a failure state of the output elements 213*a*, 215*a*, and 217*a*, and the current sensors 213*b*, 215*b*, and 217*b* through a floating state will be described as follows.

When a displacement sensor 230 normally operates, a high speed rotating motor 100 may provide a rotation shaft 150 floating command in a controller 220, and accordingly, it may supply a current to the output elements 213*a*, 215*a*, and 217*a* to float the rotation shaft 150 (see S31).

For example, the cycle until the rotation shaft 150 floats to the set optimal control range may be divided into a plurality of steps, for example, 10 steps, and it may control the rotation shaft 150 to be floated by moving a predetermined distance per each cycle of each step.

For example, if the distance until the rotation shaft 150 floats to a set optimal control range in a seating state, it may be confirmed as to whether it is floated by about 10 μm per each cycle divided into 10 steps.

That is, when a position until the rotation shaft 150 is floated to a set optimal control range is referred to as a reference position (0, 0), it may be determined that the position of the rotation shaft 150 sensed in the displacement sensor 230 in a first control cycle is a first position (0, −180) (see S321).

For example, when a position of the rotation shaft 150 is not the first position, it is determined that a floating of the rotation shaft 150 has failed, and after confirming a failure position of the current sensors 213*b*, 215*b*, and 217*b* or an output sensor, it may be possible to replace the failed current sensors 213*b*, 215*b*, and 217*b* or the output sensor (see S322 and S323).

Next, it may be determined as to whether the position of a rotation shaft 150 sensed in a displacement sensor 230 in a second control cycle is a second position (0, −160) (see S324).

When the position of the rotation shaft 150 is not the second position, it may be determined that the floating of the rotation shaft 150 has been failed, and after confirming a failure position of the current sensors 213*b*, 215*b*, and 217*b* or an output sensor, it may be possible to replace the failed current sensors 213*b*, 215*b*, and 217*b* or the output sensor (see S322 and S323).

The position of the rotation shaft 150 for each control cycle is sensed by subjecting to the above-mentioned process step by step, and it is determined that the floating of the rotation shaft 150 has been failed, after confirming the failure position of the current sensors 213*b*, 215*b*, and 217*b* or the output sensor, it may be possible to replace the failed current sensors 213*b*, 215*b*, and 217*b* or the output sensor.

Finally, it may be determined as to whether the position of the rotation shaft 150 sensed in the displacement sensor 230 in a tenth control cycle is a tenth position (0, 0) (see S325).

For example, when the position of the rotation shaft 150 is not the 10th position, it may determine that the floating of the rotation shaft 150 has been failed, and after confirming a failure position of the current sensors 213*b*, 215*b*, and 217*b* or the output sensor, it may be possible to replace the failed current sensors 213*b*, 215*b*, 217*b* or the output sensor (see S322 and S323).

On the other hand, when it is determined that the rotation shaft 150 is disposed at the 10th position in the first control cycle, it may be determined that the floating of the rotation shaft 150 may be normally done.

When the floating of the rotation shaft 150 may be normally completed, a command that the rotation shaft 150 may be in a rotatable state may be provided and it may be possible to complete a preparation to rotate the rotation shaft 150 (see S326).

Figure 10:
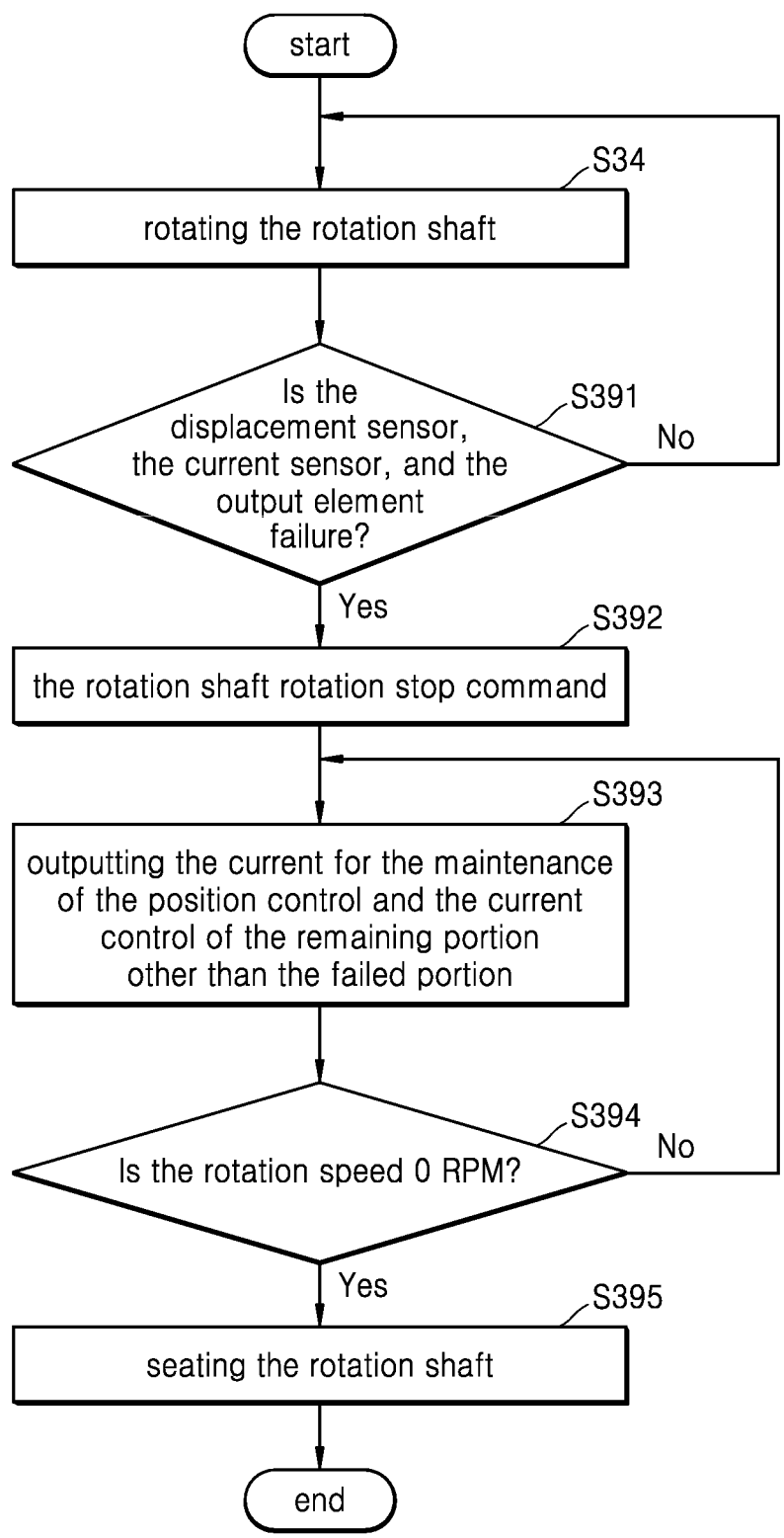
FIG. 10 is a flowchart of an example of determination of a current sensor failure of a magnetic bearing control method.

FIG. 10 is a flowchart of an example of a current sensor failure determination in a magnetic bearing control method.

Referring to FIG. 10, a method of determining a failure state in a state in which a rotation shaft 150 is floated in a magnetic bearing driving step will be described as follows.

A high speed rotating motor 100 may generate a failure due to a sensor and other factors even in a state in which a rotation shaft 150 rotates in a floated state or the floating is completed. Therefore, a failure or not may be continuously determined even in the state in which the rotation shaft 150 rotates or is floated. When it is determined as a failure, it may be necessary to stop the rotation shaft 150 and seat it.

For this purpose, the magnetic bearing driving step can determine a failure of a displacement sensor 230, the output elements 213a, 215a, 217a, the current sensors 213b, 215b, and 217b, etc., in a rotating or floating state of the rotation shaft 150 (see S391).

When a failure such as in the displacement sensor 230, the output elements 213a, 215a and 217a, and the current sensors 213b, 215b and 217b is determined, a controller 220 may provide a stop command so as to stop a rotation of the rotation shaft 150 (see S392).

It may control a current output so that the rotation shaft 150 maintains a position in a current state by using the remaining sensors except a sensor that is determined as a failure in the displacement sensor 230, the output elements 213a, 215a, and 217a, and the current sensors 213b, 215b, and 217b, etc., and control the rotation shaft 150 to be completely stopped (see S393 and S394).

Next, when the rotation shaft 150 is completely stopped, it may control the output elements 213a, 215a, and 217a so that the rotation shaft 150 descends to be seated (see S395).

While this application has been described with reference to the implementations shown in the drawings, it is to be understood that it is merely illustrative, and various modifications and other equivalent implementations can be made therefrom for the skilled person in the art to which this application pertains. Accordingly, the true technical protection scope of this application should be defined by the following claims.

DESCRIPTION OF SYMBOLS

100: High speed rotating motor
130: Stator
150: Rotation shaft
200: Magnetic bearing control apparatus
210: Magnetic bearing
220: Controller
230: Displacement sensor

What is claimed is:

1. A magnetic bearing control apparatus, comprising:
a plurality of output elements configured to generate electromagnetic force;
a magnetic bearing configured to float a rotation shaft from a surface of the magnetic bearing based on the electromagnetic force generated by the plurality of output elements;
at least one displacement sensor configured to sense a displacement of the rotation shaft;
a current sensor configured to detect a current supplied to the plurality of output elements; and
a controller configured to:
control the current supplied to the plurality of output elements,
control a position of the rotation shaft based on the current supplied to the plurality of output elements according to the displacement of the rotation shaft,
determine a failure of the displacement sensor, and
determine a failure of the plurality of output elements or the current sensor,
wherein the controller is further configured to:
perform a plurality of control cycles until the position of the rotation shaft corresponds to a set optimal control range,
control the rotation shaft to move by a predetermined distance per each control cycle of the plurality of control cycles,
sense the position of the rotation shaft in each control cycle,
based on the position of the rotation shaft sensed in each control cycle, determine whether floating of the rotation shaft from the magnetic bearing has failed, and
based on determining that the floating of the rotation shaft from the magnetic bearing has failed, determine a failure position of the current sensor or the plurality of output elements.

2. The magnetic bearing control apparatus of claim 1, wherein the displacement sensor comprises:
a photo coupler arranged adjacent to the rotation shaft and configured to output a waveform having a frequency according to the displacement of the rotation shaft;
a mixing portion configured to, based on a difference between a reference frequency and the frequency of the waveform, convert the waveform into a first signal having a conversion frequency;
a differential amplifier configured to amplify a magnitude of the first signal;
a noise filter configured to reduce a noise of the first signal amplified by the differential amplifier;
a comparator configured to convert the first signal filtered by the noise filter into a conversion waveform according to the position of the rotation shaft;
a multiplexer (MUX) configured to simplify the conversion waveform; and
a digital signal processor (DSP) input port configured to convert the conversion waveform simplified by the MUX into a digital signal.

3. The magnetic bearing control apparatus of claim 1, wherein the controller is further configured to:
adjust the electromagnetic force by increasing or decreasing the current supplied to the plurality of output elements based on the displacement of the rotation shaft; and
based on adjustment of electromagnetic force, maintain a floated state of the rotation shaft at a set position.

4. The magnetic bearing control apparatus of claim 1, wherein the displacement sensor is configured to detect a frequency of a signal corresponding to the position of the rotation shaft, and
wherein the controller is further configured to determine that the displacement sensor is disconnected from the controller based on the detected frequency being equal to zero.

5. The magnetic bearing control apparatus of claim 4, wherein the controller is further configured to determine a failure of the displacement sensor based on the detected frequency being outside of a predetermined frequency range.

6. The magnetic bearing control apparatus of claim 1, wherein the controller comprises a storage portion that is configured to:
accumulate data including a floating completion time that is taken to float the rotation shaft from a first position to a set position, a stabilization time in which the rotation shaft is disposed at the set position, and an amount of current consumed by the plurality of output elements to maintain the rotation shaft at a floated state; and
based on the accumulated data, determine a reference floating completion time, a reference stabilization time, and a reference current value.

7. The magnetic bearing control apparatus of claim 6, wherein the controller is further configured to:

based on measurement of the displacement sensor, determine a present floating completion time and a present stabilization time;

compare the present floating completion time to the reference floating completion time;

compare the present stabilization time to the reference stabilization time; and determine a failure of the plurality of output elements or the current sensor based on at least one of (i) a difference between the present floating completion time and the reference floating completion time or (ii) a difference between the present stabilization time and the reference stabilization time.

8. The magnetic bearing control apparatus of claim 7, wherein the controller is further configured to:

determine a present amount of current supplied to the plurality of output elements;

compare the present amount of current to the reference current value; and determine a failure of the plurality of output elements or the current sensor based on a difference between the present amount of current and the reference current value.

9. The magnetic bearing control apparatus of claim 6, wherein the current sensor comprises a plurality of current sensors configured to detect the current supplied to the plurality of output elements, wherein the displacement sensor comprises a plurality of displacement sensors, wherein the controller is further configured to:

based on the accumulated data, determine a failure of at least one of the plurality of displacement sensors, the plurality of output elements, or the plurality of current sensors;

determine one or more displacement sensors that operate in a normal operation state, and one or more output elements that operate in a normal state; and based on determination of the failure, control the rotation shaft to stop rotating in a floated state by controlling the one or more displacement sensors that operate in the normal operation state or the one or more output elements that operate in the normal state.

10. The magnetic bearing control apparatus of claim 9, wherein the controller is further configured to, based on the rotation shaft stopping rotation, dispose the rotation shaft to an unfloated state by controlling the one or more output elements that operate in the normal state.

11. A high speed rotating motor, comprising:

a stator configured to generate first electromagnetic force;

a rotation shaft arranged inside of the stator and configured to rotate based on the first electromagnetic force;

a magnetic bearing configured to float the rotation shaft from a surface of the magnetic bearing, the magnetic bearing comprising a plurality of output elements configured to generate second electromagnetic force and configured to enable the magnetic bearing to maintain a predetermined distance between the rotation shaft and the stator based on the second electromagnetic force;

at least one displacement sensor configured to sense a displacement of the rotation shaft;

a current sensor configured to detect a current supplied to the plurality of output elements; and a controller configured to:

control a current supplied from the plurality of output elements to the magnetic bearing, control a position of the rotation shaft based on the displacement of the rotation shaft, determine a failure of the displacement sensor, and determine a failure of the plurality of output elements or the current sensor, wherein the controller is further configured to:

perform a plurality of control cycles until the position of the rotation shaft corresponds to a set optimal control range, control the rotation shaft to move by a predetermined distance per each control cycle of the plurality of control cycles, sense the position of the rotation shaft in each control cycle, based on the position of the rotation shaft sensed in each control cycle, determine whether floating of the rotation shaft from the magnetic bearing has failed, and based on determining that the floating of the rotation shaft from the magnetic bearing has failed, determine a failure position of the current sensor or the plurality of output elements.

12. The high speed rotating motor of claim 11, wherein the displacement sensor comprises:

a photo coupler arranged adjacent to the rotation shaft and configured to output a waveform having a frequency according to the displacement of the rotation shaft;

a mixing portion configured to, based on a difference between a reference frequency and the frequency of the waveform, convert the waveform into a first signal having a conversion frequency;

a differential amplifier configured to amplify a magnitude of the first signal;

a noise filter configured to reduce a noise of the first signal amplified by the differential amplifier;

a comparator configured to convert the first signal filtered by the noise filter into a conversion waveform according to the position of the rotation shaft;

a multiplexer (MUX) configured to simplify the conversion waveform; and a digital signal processor (DSP) input port configured to convert the conversion waveform simplified by the MUX into a digital signal.

13. The high speed rotating motor of claim 11, wherein the controller is further configured to:

adjust electromagnetic force by increasing or decreasing the current supplied from the plurality of output elements to the magnetic bearing based on the displacement of the rotation shaft; and based on adjustment of electromagnetic force, maintain a floated state of the rotation shaft at a set position.

14. The high speed rotating motor of claim 11, wherein the displacement sensor is configured to detect a frequency of a signal corresponding to the position of the rotation shaft, and wherein the controller is further configured to determine that the displacement sensor is disconnected from the controller based on the detected frequency being equal to zero.

* * * * *